(12) United States Patent
Vincent et al.

(10) Patent No.: US 7,885,862 B1
(45) Date of Patent: Feb. 8, 2011

(54) DETERMINING ITEM COMPATIBILITY

(75) Inventors: Brent Allen Vincent, Seattle, WA (US); Sean M. Scott, Sammamish, WA (US); Ralph Howard Edson, III, Sammamish, WA (US); Gregory Lea Orton, Woodinville, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 12/259,731

(22) Filed: Oct. 28, 2008

(51) Int. Cl.
*G06Q 30/00* (2006.01)
(52) U.S. Cl. ...................................................... 705/26
(58) Field of Classification Search .................. 705/26, 705/27
See application file for complete search history.

(56) References Cited

U.S. PATENT DOCUMENTS

| | | | |
|---|---|---|---|
| 6,618,714 B1 * | 9/2003 | Abrahams | 706/45 |
| 7,584,159 B1 * | 9/2009 | Chakrabarti et al. | 706/45 |
| 2007/0226075 A1 * | 9/2007 | Hiroshige et al. | 705/26 |

\* cited by examiner

*Primary Examiner*—Mila Airapetian
(74) *Attorney, Agent, or Firm*—Armstrong Teasdale LLP

(57) ABSTRACT

Requests are received for information about a first item or service. Second items (or products or services) are identified that are associated with the first item or category of the first item. The compatibility of the first and second items or services is determined. The customer is informed of the outcome of the determination and provided with information about additional, compatible items or services.

30 Claims, 10 Drawing Sheets

FIG. 9

DETERMINING ITEM COMPATIBILITY

BACKGROUND

A concern of customers searching for products is whether the products are compatible with other products. In particular, confusion or interest often arises on the part of the customer as to whether a particular product is compatible with other products owned by the customer.

Customers attempt to find compatible products online using various methods. Common to many methods is a requirement that the customer provide the identity of another product (e.g., a previously purchased product) to determine if a particular product is compatible. The customer repeats this process with each retailer and each product to determine if a particular product of interest is compatible with previously purchased products. This approach is cumbersome and time-consuming and fails to provide a satisfactory shopping experience for the customer.

BRIEF DESCRIPTION OF THE DRAWINGS

FIG. 9 is an example screen shot of a user interface indicating that an item is compatible with a selected automobile.

Corresponding reference characters indicate corresponding parts throughout the drawings.

DETAILED DESCRIPTION

Disclosed embodiments enable a customer or other user to determine the compatibility of a desired item with other items. The other items include, for example, those the customer has already purchased, desires to purchase, or has otherwise specified. While examples are described herein with reference to the purchase of items or products, the purchasing of services is contemplated as well. In addition, other consumption activities such as, but not limited to, renting and leasing are contemplated. For example, users may desire to know whether an item they are considering renting is compatible with another item or service they currently own or otherwise use.

Embodiments are not limited to apply only to customers, human or otherwise. For example, a customer can be an ordinary human user, entity, or a computer program or application (e.g., a "bot").

Figure 1:
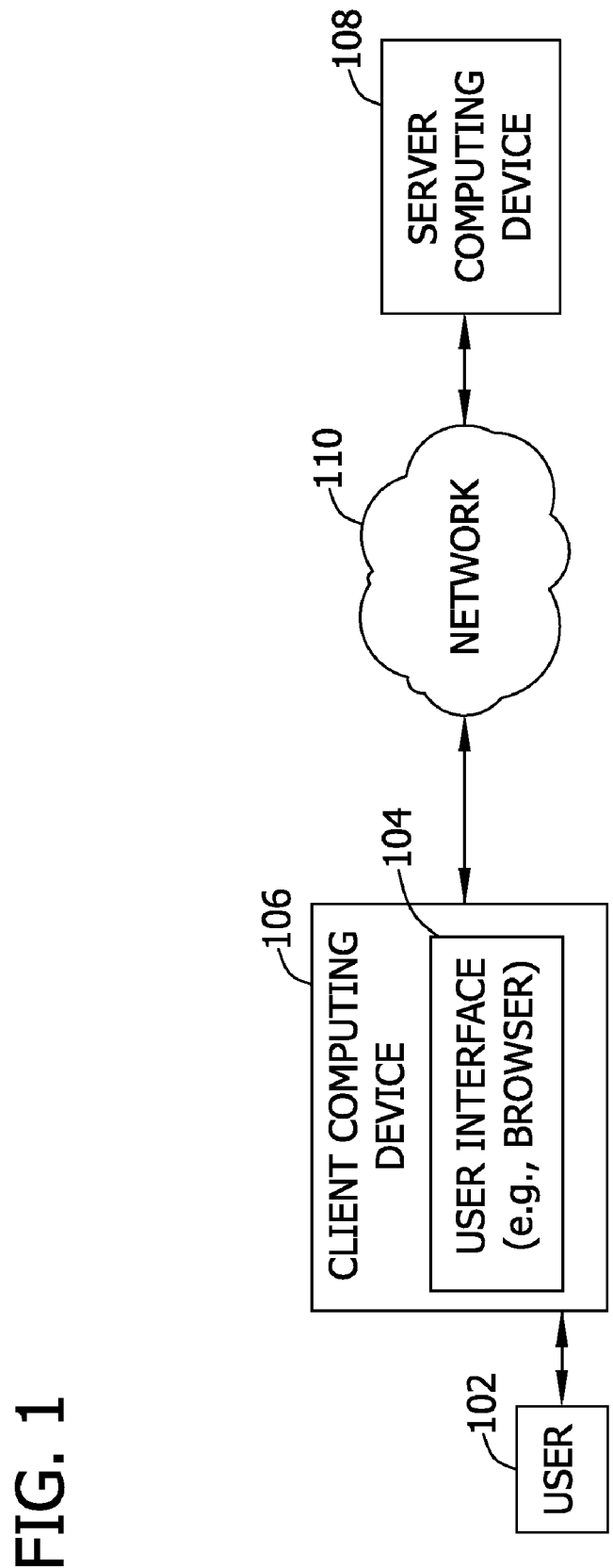
FIG. 1 is a block diagram illustrating an example system according to an embodiment in which a client computing device communicates with a server computing device via a network.

Disclosed embodiments aid user 102 of client computing device 106 as illustrated in FIG. 1 in determining the compatibility of a first item and one or more second items. In some embodiments, the compatibility determination is performed automatically. A customer (or user) 102 accesses the network 110 via a client computing device 106. The network 110 is any type of network that communicatively couples a plurality of computing devices. Examples of the network 110 are the Internet, a peer-to-peer (P2P) network, a wireless network, a local area network (LAN), or a wide area network (WAN), among others.

A client computing device 106 is any device capable of accessing the network 110. By way of example only, and not limitation, these devices include a laptop, a desktop computer, a handheld device such as an electronic book reader, a cellular phone, smart phone or a video gaming device. The client computing device 106 includes a form of computer readable media. The computer readable media stores, among other things, applications or programs executable by a processor associated with the client computing device. The client computing device 106 includes user input devices that enable the user to enter information into the client computing device 106. These include, for example, a keyboard, a pointing device, or an audio input device. The client computing device 106 also includes one or more output devices. These include, for example, a graphical display device or an audio output device.

Stored on the computer readable media on the client computing device 106 is a user interface 104 that could be, among other possibilities, a web browser. Web browsers enable users to display and interact with media and other information sometimes located on a web page or a website on a server computing device 108.

Server computing device 108 is communicatively coupled through the network 110 to the client computing device 106. Server computing device 108 is any type of server that contains a processor operable to execute computer executable instructions and a memory, or other computer-readable medium, to store and retrieve information. In some embodiments, server computing device 108 hosts an e-commerce web site. Alternatively, server computing device 108 is a social network or hosts a dating web site, among many other possibilities.

Figure 2:
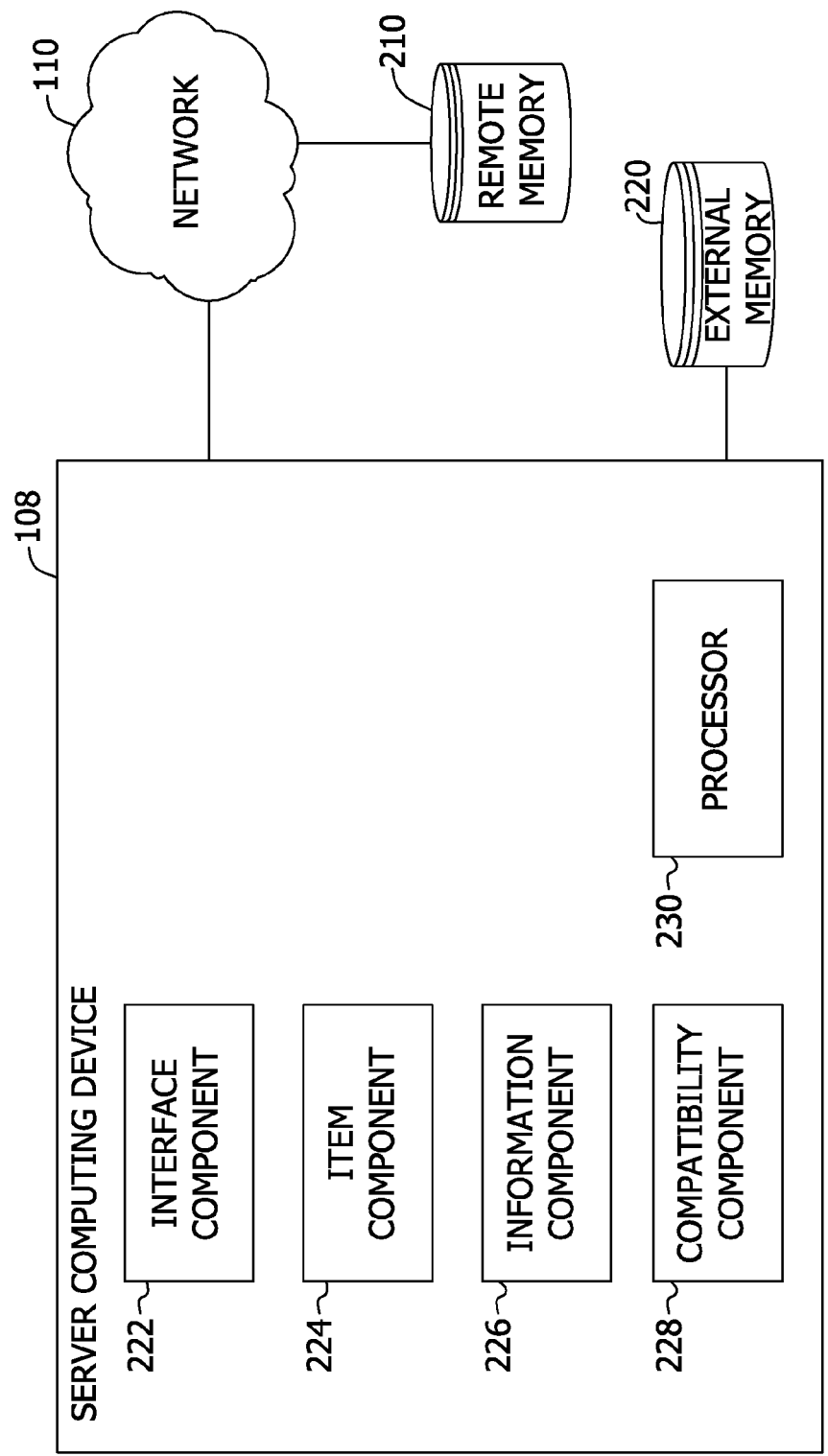
FIG. 2 is a block diagram illustrating an example server computing device storing computer-executable components for determining compatibility.

With reference now to FIG. 2, a block diagram illustrates an example server computing device 108 for executing an embodiment. Network 110 communicatively couples remote memory 210 with server computing device 108. External memory 220 is communicatively coupled to the server computing device 108. Remote memory 210 and external memory 220 are forms of computer readable media. Included within, or accessible by, the server computing device 108 are a number of components, including, but not limited to: an interface component 222, an item component 224, an information component 226, a compatibility component 228, and a processor 230. The processor 230 is operable to execute computer executable instructions, and such instructions may be wholly or partially embodied in components 222-228.

The interface component 222 is operable for receiving a request from a customer for information associated with a first item. The request is communicated to the interface component 222 from the client computing device through the network 110. The customer first enters the request into the client computing device through a user input device. The request can, for example, take the form of search terms entered into an input field through a web browser. For example, the request can be entered into a search entry field on an e-commerce web site. The e-commerce web site can be presented to the customer by communicating it through the network 110 to the user's client computing device that may be using a web browser running on the device.

The request includes information pertaining to an item or service that the customer is looking for. For instance, the request could include information describing a particular replacement part for an automobile, such as an oil, fuel, or air filter. According to another example, the request could include information describing a particular brand of removable memory card of the type commonly used in consumer electronic devices, such as digital cameras, smart phones, and media players. In other embodiments, the request could include information describing pet grooming services. In yet other embodiments, the request is for information about diamonds or other gemstones.

The information component 226 is operable for obtaining information related to the requested first item. The information is obtainable from either the external memory 220 or the remote memory 210. The information is contained in one or more data repositories such as databases that reside on the external memory 220 or the remote memory 210. Additionally while only one external memory 220 and one remote memory 210 are depicted in FIG. 2, any number of memories (or a single memory) is contemplated.

The item component 224 determines a category associated with the first item. In the example of the automobile parts provided above, one illustrative category is all replacement parts for automobiles and another possible broader category is automobiles in general. In the memory card example, one category is all memory cards, regardless of manufacturer or brand of consumer electronic devices in general. In the pet grooming example, animal services are a possible category. Concerning the diamond example, jewelry is a category as well as gemstones or precious stones. In some embodiments, only one category may be presented, but in other embodiments a plurality of categories may be presented.

In this embodiment, the interface component 222 provides a list of categories for selection by the customer and receives a selection of one or more categories in turn from the customer. The customer makes their selection through the user input device of their client computing device to select an item communicated from the website of the retailer through the network 110 to client computing device 106 for display through the web browser. The selection can, for example, take the form of a check box, radio button, or other selection means presented in the user interface of the client computing device. In other embodiments, the interface component 222 determines the appropriate category or categories for a request without requiring input from the customer or user.

One or more databases or other data stores on the remote memory 210 or the external memory 220 are accessed by embodiments of the present disclosure. The databases contain correlation information that defines categories and the types of requests and associated items that likely relate to the categories. This correlation information can be provided explicitly by manufacturers or e-commerce retailers, or derived from statistics such as feedback or browsing behavior of the users. The correlation information includes items or services that fall within the subject matter covered by the categories. In addition, the appropriate category for a request could also be determined by one or more algorithms that examine the content of the request and information about the customer's online activities to select categories that are likely relevant to the request. For example, if the user has previously visited a web page such as "Replacement Parts for Car Brand XXX" and later searches for "oil filter," aspects of the disclosed embodiments determine whether oil filters are on the "Replacement Parts for Car Brand XXX" web page. If so, the category is determined to be "replacement parts" and possibly "replacement parts for car brand XXX." The information about the customer's online activities includes, for example, the customer's web browsing history, past purchases made by the customer, or other information that may be capable of being assessed from tracking methods such as, but not limited to, web cookies and activity logging.

The item component 224 determines at least one other item based on the selected categories. If the customer selects the "all automotive replacement parts" category, specific types of automobiles can be determined by consulting databases residing in the remote memory 210 or external memory 220. When the customer selects the all types of memory card category in the example above, specific types of devices that use memory cards, such as digital cameras and media players can be determined in the same manner. In the pet grooming example, when the customer selects the animal services category different types of animals can be determined in the same manner. In the diamond example, when the customer selects the jewelry category other items of jewelry are determined, such as ring settings.

The interface component 222 provides a list of other items associated with the selected category and receives from the customer a selection from the list. The content of the list of other items associated with the selected category is determined by the item component 224. A user input device of the customer's client computing device enables the customer to input their selection of presented items in much the same manner used to enable the selection of categories by the customer.

The compatibility component 228 determines the compatibility of the first item and the selected other items. The compatibility component 228 makes this determination by consulting the databases in the remote memory 210 or the external memory 220. The information included in the database for the first item and the selected other items describes characteristics of each in sufficient detail as to permit a determination of whether they are compatible with each other.

In the automotive example, information included in the databases could include identifying part numbers for replacement parts for the particular automobile selected and a corresponding part number for the particular type of automotive replacement part selected. In the memory card example, information in the databases includes information detailing the types of memory cards that are compatible with the selected consumer electronics device as well as identifying information for the selected type of memory card. The identifying information is of sufficient detail as to determine whether the memory card is compatible with the selected consumer electronics device.

For the pet grooming example, the information in the databases could include the specific breed, size, age or sex of the pet and requirements of the pet grooming service. The pet grooming service could have restrictions as to breeds or types of animals they groom or specific age requirements of the animals. For example, the pet grooming service may not groom particularly violent breeds of dogs or those younger than 6 months old. In the diamond example, the information about the diamond could detail the size and cut of the diamond and the information about the ring setting could describe the range of sizes and cuts of gemstones that are compatible with the setting.

The interface component 222 indicates the determined compatibility and the requested information to the customer. The determined compatibility and requested information are communicated to the customer as a notification over the network 110 for presentment to the customer through the web browser on the client computing device. The notification takes many forms, and conveys to the customer the determined compatibility and the requested information associated with the first item. The notification may be an audio or visual notification, or any combination thereof.

If the first item and the selected other items are determined to be incompatible, the item component 224 consults the databases in the external memory 220 and the remote memory 210 to determine yet other items that are compatible with the selected other items. These items are in the same category as the selected item, or they may be in a different category. A list of the items is provided by the interface component 222 along with a notification that the selected other items were not compatible with the first item. In this manner, the customer is provided with other options for purchasing a product, service, or other item that is compatible with the selected other items.

Figure 3:
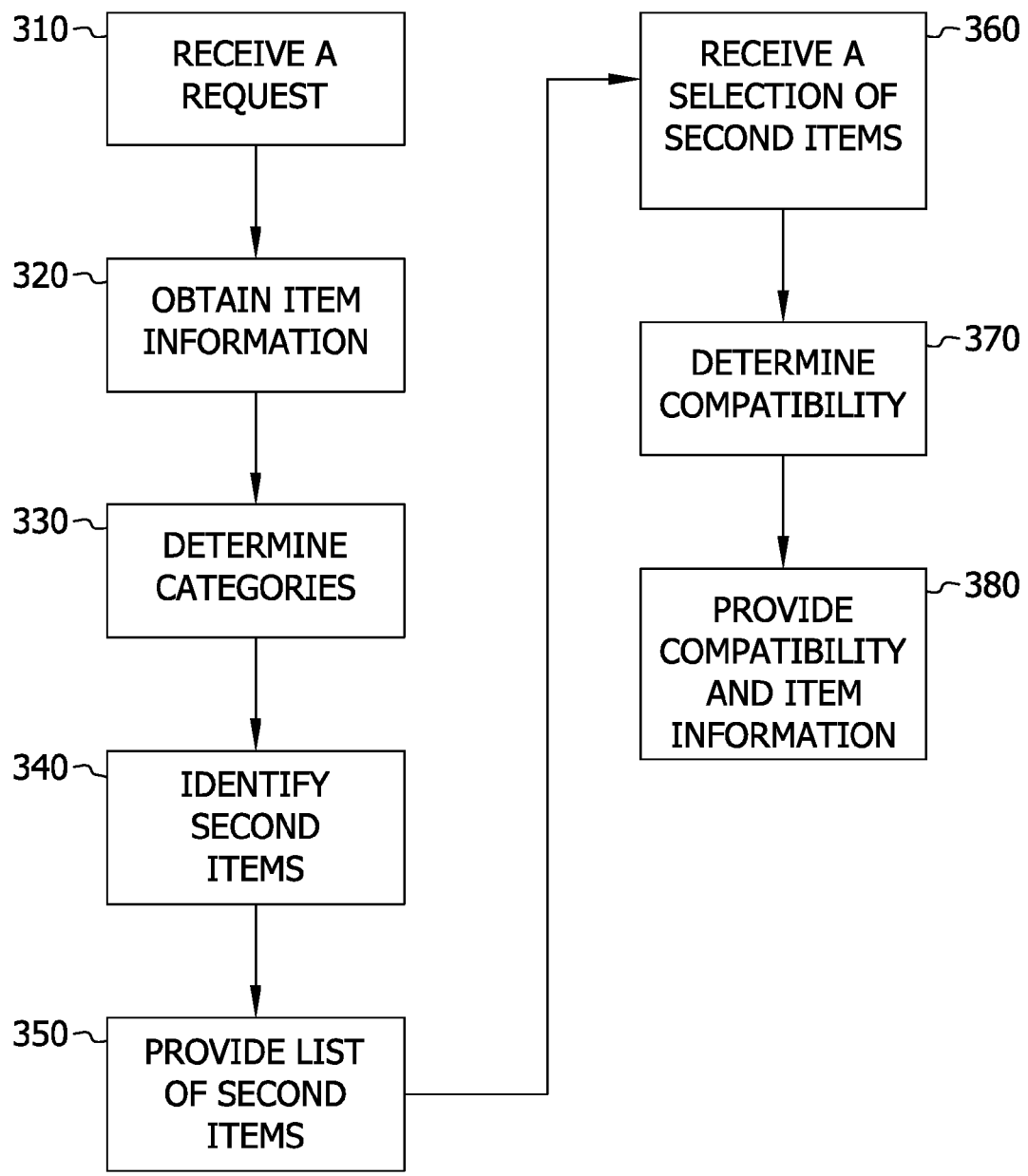
FIG. 3 is an example flow chart for determining the compatibility of a first item and a second item selected by the user.

Referring next to FIG. 3, a flow chart illustrating exemplary methods for determining the compatibility of a first item and a second item is provided. The method begins in block 310 with the receiving of a request for information associated with a first item from a customer. The request for information is communicated from the client computing device through the network. The customer first enters the request into the client computing device with the user input device. The request can, for example, take the form of search terms submitted to a search engine through the web browser.

The request includes information detailing a specific item or service that the customer seeks. For instance, the request could include information describing a particular replacement part for an automobile, such as an oil, fuel, or air filter. The request could alternatively include information describing a particular brand of removable memory card of the type commonly used in consumer electronic devices, such as digital cameras, smart phones, and media players. In other embodiments, the request could include information describing pet grooming services that customer seeks. In yet other embodiments, the request is for information about diamonds or other gemstones.

In block 320, information is obtained that is responsive to the request received in block 310. The information is obtained from databases located on one or more servers. The servers are the same servers of the party that the request is proposed to, such as the e-commerce web site, or the servers are maintained by third parties. When an item is the subject of the request, the information can detail features and specifications of the item. When a service is the subject of the request, the information could detail the specific services offered by a service provider. Included within both types of information are reviews or editorial comments from others users about the particular item or service along with prices for the item or service.

A determination is made as to which category is associated with the first item in block 330. Categories are hierarchical structures that aid in the classifying of items and services. A category defines types of items and services that relate to each other. One or more items or services are included within a category. Additionally, one item or service may be included in multiple categories. Still further, a first category may be included within another second category. In these instances, a second category is broader than the first category, and therefore encompasses all of the subject matter covered by the first category. The second category is therefore higher in the hierarchical structure than the first category.

In the example of the automobile parts provided above, one category is all replacement parts for automobiles and another broader category is automobiles in general. In the memory card example, one category is all memory cards, regardless of manufacturer or brand. In the pet grooming example, animal services can be a category. Concerning the diamond example, jewelry is a category as well as gemstones or precious stones. Embodiments contemplate the providing of one or more categories for each request. In some embodiments, only one category may be determined, but in other embodiments, a plurality of categories may be determined.

In order to determine a category associated with a first item or service, an appropriate category or categories may be determined without input from the customer. In other embodiments, the customer is presented with a list of categories and prompted to select one or more.

To determine an appropriate category for the first item, one or more databases are consulted. The databases contain correlation information that defines categories and the types of requests and associated items that likely relate to the categories. The correlation information is input to the databases by users of the e-commerce web site and also includes items or services that fall within the subject matter covered by the categories. In addition, the appropriate category for a request could also be determined by one or more algorithms that examine the content of the request and associated item and information about the customer's online activities to select categories that are likely relevant to the request. The information about the customer's online activities include, for example, the customer's web browsing history, past purchases made by the customer, or other tracking methods such as cookies.

At block 340, one or more second items are identified. The one or more identified second items are associated with the determined category and associated with the first item. To identify the second items, a memory area on the server computing device is searchable. In the above example, if the customer selected the all automotive replacement parts category, specific types of automobiles can be determined by consulting databases residing on the server. When the customer selects the all types of memory card category in the example above, specific types of devices that use memory cards, such as digital cameras and media players can be determined in the same manner. In the pet grooming example, when the customer selects the animal services category, different types of animals can be determined in the same manner. In the diamond example, when the customer selects the jewelry category other items of jewelry can be determined, such as ring settings.

In block 350, a list of the one or more second items identified in block 340 is provided to a customer for display and selection. The list of second items is those identified in block 340, above. The list is communicated to the customer's client computing device from one or more servers of the e-commerce web site over the network. The list of second items is then presented to the user through a web browser on the user's client computing device. In other embodiments, the list of second items may belong to the same category as the first item.

A selection of at least one of the displayed second items is received from the customer in block 360. A user input device of the customer's client computing device enables the customer to input their selection of one or more of the second items. The selection is communicated through the network to one or more servers of the e-commerce web site. The selection takes the form of a check box or other selection means presented in the user interface of the client computing device. In other embodiments where the list included second items that belonged to the same category as the first item, a selection may accordingly be received from that list.

A determination of the compatibility of the at least one selected item and the first item occurs in block 370. To make the determination, one or more databases are consulted. The databases are maintained by the e-commerce web site on one or more servers, or the databases are maintained by third parties on their respective servers. The information included in the database for the first and second items describe characteristics of each in sufficient detail as to permit a determination of whether they are compatible with each other.

The databases or other memory areas storing compatibility information may be updated periodically. In addition to positively identifying compatibility between items, contrary indicators for compatibility include, for example, a negative review by a user, a quantity of the items that are returned by the users, or input from customer service centers regarding problems such as service difficulties, failure rates, or poor performance of the items.

At block 380, the compatibility determined in block 370 and the information obtained in block 320 are provided to the customer. The compatibility and the requested information are communicated as a notification to the customer over the network to the client computing device and presented through the web browser. The notification takes many forms, and conveys to the customer the determined compatibility and the requested information associated with the first item. The notification is an audio or visual notification, or any combination thereof. The notification indicates that the first item and the second items are not compatible, or the notification indicates the first item and second items are compatible.

If the first item and the selected second item are determined to be incompatible, the databases are consulted to determine other items that are compatible with the second item. These other items are in the same category as the second item, or they are in a different category. A list of items is provided to the customer along with a notification that the first item is not compatible with the second item. In this manner, the customer is provided with other options for purchasing items or services that are compatible with the second item.

Figure 4:
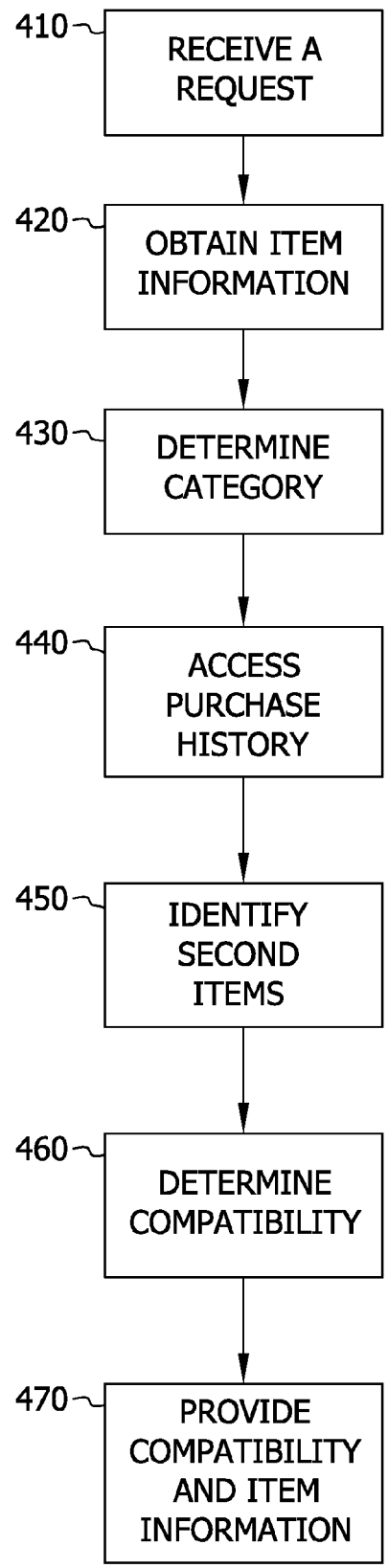
FIG. 4 is an example flow chart for determining compatibility of a first item and a second item based on a purchase history.

Turning now to FIG. 4, a flow chart illustrating exemplary methods for determining compatibility of a first item with a second item is presented. The method may be employed in a computing system comprising a memory area for storing customer activity (e.g., purchase history of the customer, a browsing history of the customer, an item review written by the customer, or any other user activity) and compatibility information and a processor programmed to carry out the steps illustrated in blocks 410 through 470 in FIG. 4. In the example of FIG. 4, the purchase history is used to automatically determine item compatibility and indicate the compatibility information to the user.

The method begins at block 410 when a request for information associated with a first item is received. The customer first enters the request into the client computing device using a user input device. The request takes the form of search terms entered into a search engine through a web browser. In other embodiments, the request is entered in a search entry field on an e-commerce web site, or through navigation on the web site. The e-commerce web site can be presented to the customer by communicating it through the network to the client computing device.

The request includes information detailing a specific item such as a product or service that the customer seeks. For instance, the request could include information describing a particular replacement part for an automobile, such as an oil, fuel, or air filter. The request could alternatively include information describing a particular brand of removable memory card of the type commonly used in consumer electronic devices, such as digital cameras, smart phones, and media players. In other embodiments, the request could include information describing pet grooming services. In yet other embodiments, the request is for information about diamonds or other gemstones.

In block 420, information responsive to the request received in block 410 is obtained. The information is obtained from databases located on one or more servers.

At least one category associated with the first item is determined in block 430. A more thorough discussion of categories is provided in relation to block 330 of FIG. 3, above.

In the example of the automobile parts provided above, one category is all replacement parts for automobiles and another broader category is automobiles in general. In the memory card example, one category is all memory cards, regardless of manufacturer or brand. In the pet grooming example, animal services are a likely category. Concerning the diamond example, jewelry is a category as well as gemstones or precious stones. Embodiments contemplate the providing of one or more categories for each request. In some embodiments, only one category may be determined, but in other embodiments, a plurality of categories may be determined.

In order to determine a category associated with a first item or service, an appropriate category or categories are determined without input from the customer. In other embodiments, the customer is presented with a list of categories and selects one or more of them.

To determine an appropriate category for the first item, one or more databases are consulted. The databases contain correlation information that defines categories and the types of requests and associated items that likely relate to the categories. The correlation information is input to the databases by users of the e-commerce web site and also includes items or services that fall within the subject matter covered by the categories. In addition, the appropriate category for a request could also be determined by one or more algorithms that examine the content of the request and associated item and information about the customer's online activities to select categories that are likely relevant to the request. The information about the customer's online activities include, for example, the customer's web browsing history, past purchases made by the customer, or other tracking methods such as cookies.

At block 440, the purchase history associated with the customer is accessed. The purchase history of the customer is stored in databases on servers. The servers are those of the e-commerce web site or those of third parties. The purchase history is stored by the e-commerce web site in a customer profile. The customer profile provides biographical information about the customer along with item preferences and a history of items purchased by the user. User profiles are also maintained by third parties that detail purchases made by a customer from a variety of e-commerce websites.

To access the customer profile, a customer is prompted to supply uniquely identifying credentials to validate their identity. Cookies and other web browsing tracking techniques may also be used to validate the identity of a customer.

The information that is likely to be accessed from the purchase history may be varied in nature. In the automobile example, the customer's purchase could indicate that they had purchased other replacement parts for a make, model, and year of automobile. In the memory card example, the purchase history could show that the customer had recently purchased a particular make and model of digital camera. Additionally, the customer's purchase history may be gleaned from other online resources, such as social networking web sites. Staying with the memory card example, assume that the customer recently posted an item on their profile on a social networking web site that stated they were very satisfied with their particular make and model of digital camera. The identity of the camera can then form part of the purchase history.

In the pet grooming example, the purchase history might indicate that the customer had recently purchased or browsed books on Labrador retrievers. The purchase might also indicate that the customer had recently purchased a dog collar for mature, male dogs. In the diamond example, the purchase history might indicate that the customer had recently browsed jewelry websites and purchased or viewed ring settings for princess cut gemstones.

In block 450, one or more second items associated with accessed purchase history and associated with determined category are identified. In the automobile example, the particular make, model and year of vehicle is a second item associated with the purchase history. In the memory card example, a particular make and model of digital camera is a second item associated with the purchase history. A mature, male Labrador retriever is a second item associated with the purchase history in the pet grooming example. Ring settings for princess cut gemstones can be a second item in the diamond example.

Additionally, a preferred brand is determined by accessing the purchase history, and only second items of that brand are identified. The brand can then serve as a filter of otherwise eligible second items. For instance, in the memory card example the customer's purchase history indicates a preference for a particular brand of consumer electronics. Alternatively, the content of the request is analyzed to determine one or more keywords. These keywords are then used to filter the otherwise eligible second items. Other attributes determined from the purchase history may also be used to identify the second items.

An attribute of the first item is also taken into consideration when identifying a second item. The attribute is a particular trait or characteristic of the first item. The attribute could then be used to filter the otherwise eligible second items.

The compatibility of the one or more second items identified in block 450 and the first item is determined in block 460. To make the determination, one or more databases are consulted. The databases are maintained by the e-commerce web site on one or more servers, or the databases are maintained by third parties on their respective servers. The information included in the database for the first and second items describe characteristics of each in sufficient detail as to permit a determination of whether they are compatible with each other.

The determined compatibility from block 460 and the information obtained in block 420 are provided to the customer in block 470. The compatibility and the requested information are communicated as a notification to the customer over the network to the customer's client computing device and presented through the web browser. The notification takes many forms, and conveys to the customer the determined compatibility and the requested information associated with the first item. The notification is an audio or visual notification, or any combination thereof.

If the first item and the selected second item are determined to be incompatible, the databases are consulted to determine other items that are compatible with the second item. These other items may be in the same category as the second item, or they may be in a different category. A list of items is provided to the customer along with a notification that the first item is not compatible with the second item. In this manner, the customer is provided with other options for purchasing items or services that are compatible with the second item.

Figure 5:
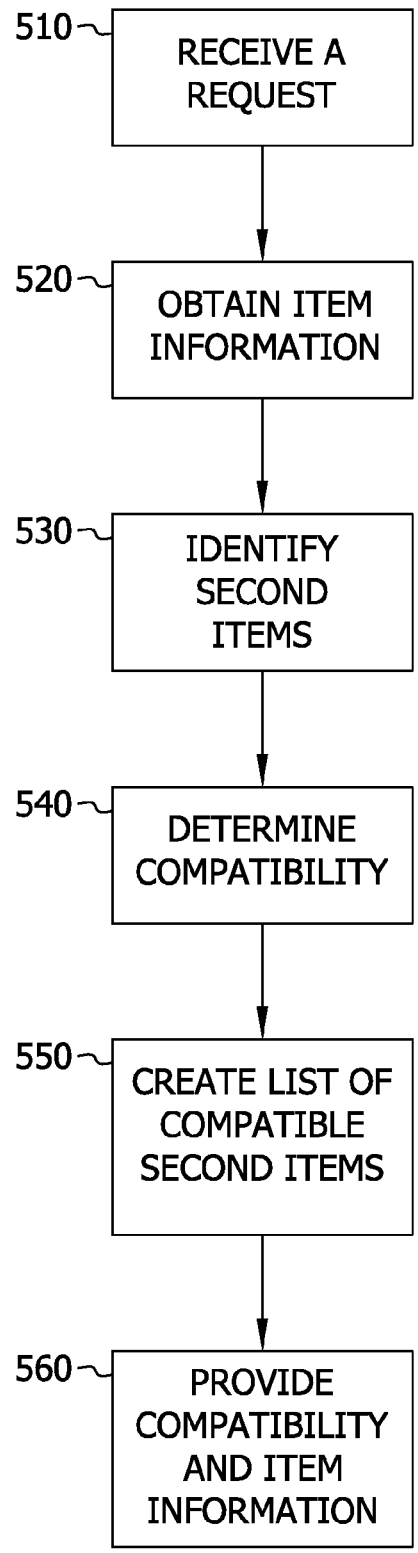
FIG. 5 is an example flow chart for determining compatibility of a first item and a second item automatically selected.

With reference now to FIG. 5, a flow chart illustrating exemplary methods for determining compatibility is presented. In block 510, a request is received from a customer for information associated with a first item. The first item is associated with at least one category.

The customer first enters the request into the client computing device through a user input device. The request takes the form of search terms entered into a search engine through a web browser. In other embodiments, the request is entered in a search entry field on an e-commerce web site. The e-commerce web site is presented to the customer by communicating it through the network to the client computing device.

The request includes information detailing a specific item or service that the customer seeks. For instance, the request includes information describing a particular replacement part for an automobile, such as an oil, fuel, or air filter. An associated category is an automotive category. The request alternatively includes information describing a particular brand of removable memory card of the type commonly used in consumer electronic devices, such as digital cameras, smart phones, and media players. The corresponding category is a consumer electronic device category. In other embodiments, the request could include information describing pet grooming services and be included in an animal category. In yet other embodiments, the request is for information about diamonds or other gemstones and be included in a jewelry category. A more thorough discussion of categories is presented in conjunction with FIG. 3, above.

In block 520, information responsive to the request received in block 510 is obtained. The information is obtained from databases located on one or more servers.

At block 530 one or more second items associated with the at least one category and the first item are identified. The second items are determined using a variety of methods. As described above, the customer's purchase history may be analyzed to determine a list of second items (e.g., to identify past purchases that may be compatible products). The customer's purchase history is stored in a user profile of the e-commerce web site or a third party web site or server. The customer is prompted to validate their identity in order to access a corresponding customer profile. Any groups associated with the second items may also be analyzed to determine if they overlap with the first item and therefore indicate an association between the two.

Information relating to second items is also gleaned from the customer's online activities. The online activities include the customer's browsing history, social networking web site activity, or browser cookies that disclose other web sites that customer has frequented.

The information that is likely to be used to determine second items associated with the first item varies in nature. In the automobile example, the customer's purchase history could indicate that they had purchased other replacement parts for a particular year, make, and model of automobile. That particular automobile can be a second item in the same category as the first item, an automotive category.

In the memory card example, the customer's browsing history could show that the customer had browsed web sites for owners of the particular make and model of digital camera. Additionally, the customer's intent is determined from other online resources that the customer had purchased such a camera, such as by consulting a social networking web site.

Staying with the memory card example, assume that the customer recently posted an item on their profile on a social networking web site that stated they were very satisfied with their particular make and model of digital camera. The second item can then be the camera and be in the same category as the first item, namely a consumer electronics category.

In the pet grooming example, the purchase history might indicate that the customer had recently purchased or browsed books on Labrador retrievers. The purchase might also indicate that the customer had recently purchased a dog collar for mature, male dogs. The second item can then be a mature, male Labrador retriever and be in the same category as the first item, the animal category.

In the diamond example, the purchase history might indicate that the customer had recently browsed jewelry websites and purchased or view ring settings for princess cut gemstones. The second item can then be a ring setting for princess cut gemstones and be in the jewelry category.

In block 540, the identified one or more second items are compared with the at least one item previously associated with the customer, thereby determining the compatibility between the two. To make the determination, one or more databases are consulted. The databases are maintained by the e-commerce web site on one or more servers, or the databases are maintained by third parties on their respective servers. The information included in the database for the first and second items describe characteristics of each in sufficient detail as to permit a determination of whether they are compatible with each other.

In the automotive example, information included in the databases could include identifying part numbers for replacement parts for the particular year, make, and model of automobile and a corresponding part number for the particular type of automotive replacement part selected. In the memory card example, information in the databases includes information detailing the types of memory cards that are compatible particular make and model of digital camera as well as identifying information for the selected type of memory card. The identifying information is of sufficient detail as to determine whether the memory card is compatible with the selected consumer electronics device, in this case a particular make and model of digital camera.

For the pet grooming example, the information in the databases could include the specific breed, age, or sex of the Labrador retriever and requirements of the pet grooming service. The pet grooming service could have restrictions as to breeds or types of animals they groom or specific age requirements of the animals. For example, the pet grooming service may not groom particularly violent breeds of dogs or those younger than 6 months old. In the diamond example, the information about the diamond could detail the size and cut of the diamond and the information about the ring could describe range of sizes and cuts of gemstones that are compatible with the setting.

A list of compatible second items is then created in block 550. The list includes second items that were determined in block 540 to be compatible with the first item.

The list of compatible second items created in block 550 and the information obtained in block 520 is then indicated or provided to the customer in block 550. The compatibility and the requested information are communicated as a notification to the customer over the network to the customer's client computing device and presented through the web browser. The notification takes many forms, and conveys to the customer the determined compatibility and the requested information associated with the first item. The notification includes audio or visual notification, or any combination thereof.

In an example, the user has browsed or purchased one or more printers and is now browsing printer cables. As the user browses the printer cables, embodiments of the present disclosure determine the compatibility of each of the printer cables based on the browsing or purchase history of the user. The determined compatibility is then provided to the user during browsing to enable the user to make a proper cable selection.

FIGS. 6-11 provide screen shots of user interfaces for embodiments dealing with automotive parts. They are exemplary in nature only and are not intended to limit the scope of the embodiments. To the contrary, a plurality of items such as products and services are contemplated in addition to those delineated above and below.

Figure 6:
FIG. 6 is an example screen shot of a user interface having an item description and a user interface component for selecting an automobile previously identified by the user.

FIG. 6 is an example screen shot of an item description on the web site of an e-commerce retailer. The screen shot is that of a web browser presenting a web page generated by a web site of an e-commerce retailer. The web page is communicated over a network to a web browser running on a customer's client computing device. While FIG. 6 is illustrated and described in the context of the web browser and at least one web server, other environments are contemplated. For example, aspects of the invention are operable in a peer-to-peer environment, on a personal computer, and in a kiosk (e.g., at an auto parts store).

Included in the illustrative web page are an item identification 610, price information 620, availability information 630, compatibility area 640, compatibility notice 642, second item list link 643, second item drop down 644, second item select link 646, first item image 650, and first item information 660.

The item identification 610 provides basic identification information about the item such as a product name and part number. This information is sufficient for a customer to identify the item, in some embodiments. The price information 620 defines various prices of the item, such as a list or retail price and a discounted price. Availability information 630 informs the customer of whether the e-commerce retailer has the item in stock or when the item is estimated to be available for shipment.

Compatibility area 640 encompasses a portion of the web page where compatibility information is presented to the customer. The compatibility notice 642 can be used to notify the customer as to the subject matter of the compatibility area 640. In some embodiments, the compatibility notice 642 indicates to the user whether the item is compatible. While the phrase "Make Sure It Fits" is used in the compatibility notice 642, any suitable phrase can serve the same purpose. For instance, if the item is an article of clothing an additional phrase of "Be Sure It Matches" can be used to alert the customer to the web site's ability to ensure that the clothing matched (e.g., matching size, color, and/or style) other items of clothing previously purchased by the customer.

Second item list link 643 is a hypertext link to another web page listing second items previously associated with the customer. By selecting the second item list link 643 the web browser will be directed to another web page that lists the second items. In the example provided in FIG. 6, the second item list link 643 is a list of second items referred to as "Your Garage" that includes identification information of automobiles, watercraft, and motorcycles that customer has provided to the e-commerce web site. This information is stored in a customer profile by the e-commerce web site so that the customer does not need to reenter the information each time they visit the web page of the e-commerce retailer. In addition to identification information about the various items in the profile, the customer can also include other information about each item, such as colors, size, custom modifications made to the items, among many other attributes. For example, the customer may not only include a specific make and model of an owned motorcycle, but may also include the color and various accessories that have been added to the stock motorcycle (e.g., heated grips, hand guards, skid plate, center stand, engine guards, etc.) as these may affect the compatibility of other items. The customer may add, delete or otherwise modify the items and attributes that are associated with the customer profile as needed.

Upon selecting the second item list link 643 and being directed to the second item list web page, the customer selects one or more of the second items to determine if the first item is compatible with the second item.

Second item drop down 644 enables the customer to select second items without the need to be directed to another web page, as needed in the second item list link 643. Instead, upon selecting the second item drop down 644, a list of previously stored second items appears overlaid on that portion of the web page. The customer then selects one of the second items from the list to determine if the first item is compatible with the selected second item.

Figure 9:
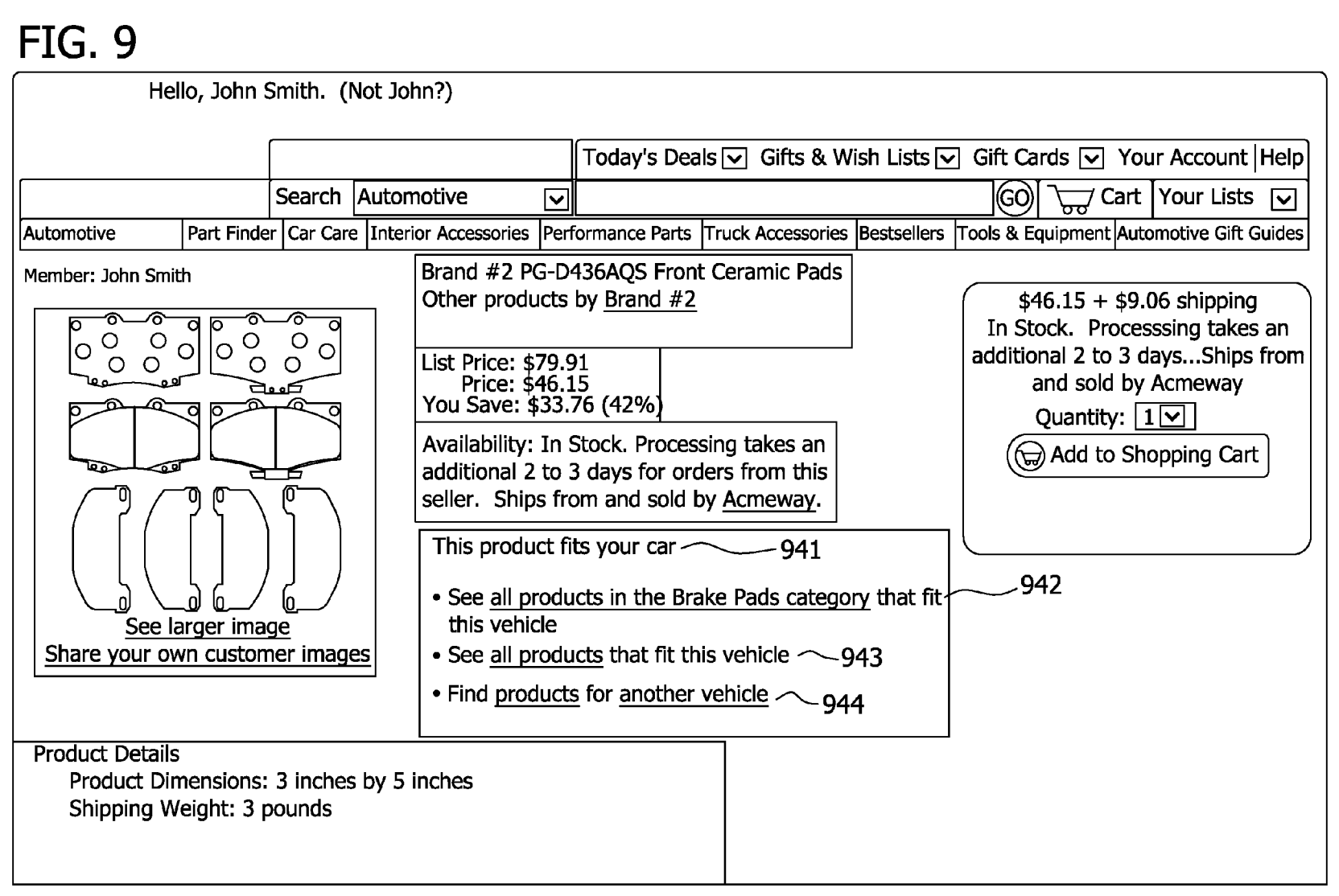

Second item select link 646 is a hypertext link that upon selection by the customer, directs the customer to another web page where the customer selects a second item from a list of second items. For example, according to the present example, the customer may select a new vehicle to add to the customer profile (e.g., the customer's garage). After the customer selects one of the second items, the compatibility of the first and selected second items is determined. An example output after determining compatibility is depicted in FIG. 9.

First item information 660 provides detailed information about the specifications and features of the first item. This information is more detailed than the cursory identification information provided in the item description 610. First item image 650 is a pictorial representation of the first item.

While portions of FIG. 6 and the associated description include reference to links from one page to another, aspects of the invention contemplate other means that do not include links, or a combination of links and the other means. For example, overlays and in-page updates are contemplated.

Figure 7:
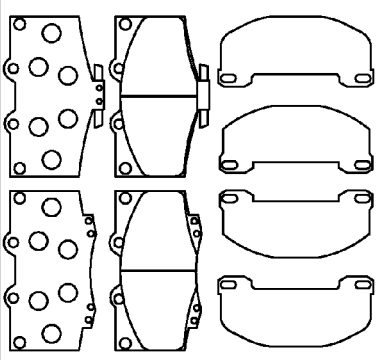
FIG. 7 is an example screen shot of a user interface having an item description and a user interface component for selecting a make and model of an automobile.

FIG. 7 is an example screen shot of a user interface depicting an item description on the web site of an e-commerce retailer. Certain fields in FIG. 7 are similar to those described in other embodiments (e.g., FIGS. 6 and 8-10).

Second item selection notification 744 alerts the user to what it is they are selecting with second item selectors 746 and 748. Second item selectors 746 and 748 are drop down menus that permit a customer to easily select a specific second item. Second item selector 746 provides a means to select a broad group of second items, here a model year of all vehicles. Second item selector 748 then enables a user to select items that are part of the broad group selected with second item selector 746. In effect, second item selectors 746 and 748 permit the customer to reduce the number of second items available for selection in a recursive fashion, where after each use of a second item selector 746 and 748, the pool of available second items becomes smaller and smaller. After the use of the last second item selector, the second item will be defined with sufficient specificity to permit an accurate compatibility determination to be made between it and the first item.

In the automotive example provided in FIG. 7, second item selectors permit the selection of year, make, model, and options. The selectors are arranged in that order so that a customer will only be presented with models that were available for a selected year and make. The same holds true with the options. While three second item selectors 746 and 748 are depicted in FIG. 7, any number of item selectors may be used in embodiments.

Sign in field notice 741 provides a hypertext link that upon selection permits a user to validate their identity and sign in to a customer profile that includes one or more second items associated with the user.

Update icon 749 submits the items selected with the second item selectors 746 and 748 to the web site of the e-commerce retailer. Update icon 749 performs this action upon the selection thereof by the customer.

Figure 8:
FIG. 8 is an example screen shot of a user interface having an item description and a user interface component for selecting a trim for an automobile.

FIG. 8 is an example screen shot of an item description on the web site of an e-commerce retailer. Certain fields in FIG. 8 are similar to those described in other embodiments (e.g., FIGS. 6, 7, 9, and 10).

Second item selection notification 842 alerts the user to what it is they are selecting with second item selectors 843 and 844. Second item selectors 843 and 844 are drop down menus that permit a customer to easily specify additional features of the second item. In the automotive example provided in FIG. 8, the e-commerce retailer already knows, through various methods described above in relation to FIGS. 2-5, the identity of the second item.

Second item selector 843 provides a means to select additional information that describes the second item. In the example provided in FIG. 8, the additional information is a trim level of the customer's 1970 Car Model X. Second item selector 844 provides a means to select yet additional information that describes the second item. In this example, the additional information is the type of engine that the customer's 1970 Car Model X is equipped with.

FIG. 9 is an example screen shot of an item description on the web site of an e-commerce retailer. Certain fields in FIG. 7 are similar to those described in other embodiments (e.g., FIGS. 6-8 and 10).

Compatibility area 940 encompasses a portion of the web page where compatibility information is received and presented to the customer. The compatibility notice 941 alerts the customer that the first item is compatible with a second item of the customer's, here a car. In the automotive example provided here, the e-commerce retailer already knows, through various methods described above in relation to FIGS. 2-8, the identity of the second item.

Additional item selector 942 provides a hypertext link to additional items that are compatible with the customer's second item that are of the same category of the first item. In this example, the additional item selector 942 is a hypertext link to additional brake pads that fit the customer's car.

All item selector 943 provides a hypertext link to additional items that are compatible with the customer's second item, but do not necessarily belong to the same category than the first item. In this example, the all item selector 943 is a hypertext link to additional parts that fit the customer's car.

Other second item selector 944 is a hypertext link that provides a way for the customer to select another second item. This is useful at least when the customer is seeking items that are compatible with another second item. In embodiments where the e-commerce retailer has mistakenly associated a second item with the customer, this provides a way for the customer to rectify the mistake.

Figure 10:
FIG. 10 is an example screen shot of a user interface indicating that an item is not compatible with a selected automobile.

FIG. 10 is an example screen shot of an item description on the web site of an e-commerce retailer. Certain fields in FIG. 7 are similar to those described in other embodiments (e.g., FIGS. 6-9).

Compatibility area 1050 encompasses a portion of the web page where compatibility information is received and presented to the customer. The compatibility notice 1040 alerts the customer as to whether the first item is compatible with a second item of the customer's (e.g., an automobile). In the automotive example provided here, the e-commerce retailer already knows, through various methods described above in relation to FIGS. 2-5, the identity of the second item and is able to determine whether the first item and second item are compatible.

Additional item selector 1042 provides hypertext links to additional items that are compatible with the customer's second item. In this example, the additional item selector 1042 is a hypertext link to additional brake pads that fit the customer's car. Additionally, hypertext links may also be provided to web pages that list second items that are compatible with the first item.

Other item selectors 1051 and 1052 permit a customer to select other second items that they seek to find compatible items. In the other item selector 1051, a list of second items associated with the customer is provided. A customer then selects a second item from the list. In other item selector 1052, means are provided for the customer to select another second item. This is accomplished through a number of methods, although the example in FIG. 10 utilizes drop down menus. Once a second item is selected with the other item selector 1052, the item may be saved to a customer's profile upon the selection of save second item icon 1052.

All item selector 943 provides a hypertext link to additional items that are compatible with the customer's second item, but belong to a different category than the first item. In this example, the all item selector 943 is a hypertext link to additional parts that fit the customer's car.

Exemplary Operating Environment

A computing device, computer, or client computing device such as described herein has one or more processors or processing units and a system memory. The computer typically has at least some form of computer readable media. Computer readable media, which include both volatile and nonvolatile media, removable and non-removable media, may be any available medium that may be accessed by computer. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although described in connection with an exemplary computing system environment, embodiments are operational with numerous other general purpose or special purpose computing system environments or configurations. The computing system environment is not intended to suggest any limitation as to the scope of use or functionality of any aspect. Moreover, the computing system environment should not be interpreted as having any dependency or requirement relating to any one or combination of components illustrated in the exemplary operating environment. Examples of well known computing systems, environments, and/or configurations that may be suitable for use with aspects include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects may be implemented with any number and organization of such components or modules. For example, aspects are not limited to the specific computer-executable instructions or the specific components or modules illustrated in the figures and described herein. Other embodiments may include different computer-executable instructions or components having more or less functionality than illustrated and described herein.

The embodiments illustrated and described herein as well as embodiments not specifically described herein but within the scope of aspects constitute exemplary means for determining the compatibility of the first item with the second item and exemplary means for identifying the second items and determining compatibility of the identified second items with the first item.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects.

When introducing elements of aspects or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects in detail, it will be apparent that modifications and variations are possible without departing from the scope of aspects as defined in the appended claims. As various changes could be made in the above constructions, products, and methods without departing from the scope of aspects, it is intended that all matter contained in the above description and shown in the accompanying drawings shall be interpreted as illustrative and not in a limiting sense.

What is claimed is:

1. A method for determining compatibility between items, said method comprising:
   receiving a request for information associated with a first item from a customer;
   obtaining the requested information responsive to the received request;
   examining online activity of the customer;
   determining, via a processor, a category associated with the first item based at least in part on the examined online activity of the customer;

identifying, via the processor, one or more second items associated with the determined category and associated with the first item, wherein the identified one or more second items have different utility than the first item;

providing a list of the identified one or more second items to the customer for display and selection;

receiving, from the customer, a selection of at least one of the displayed second items;

determining, via the processor, compatibility of the at least one selected second item and the first item; and providing the determined compatibility and the obtained information to the customer.

2. The method of claim 1, wherein identifying the one or more second items comprises searching a memory area based on the determined category.

3. The method of claim 1, wherein receiving the selection comprises:

providing the identified second items associated with the determined category; and receiving from the customer at least one selection from the provided second items.

4. The method of claim 1, wherein providing the determined compatibility comprises indicating that the first item and at least one of the identified second items are not compatible.

5. The method of claim 1, wherein providing the determined compatibility comprises indicating that the first item and at least one of the identified second items are compatible.

6. The method of claim 1, wherein the category is one or more of the following: automotive, electronics, and literary works.

7. The method of claim 1, wherein the first item is a type of automotive replacement part, and wherein the one or more second types of items are automobiles.

8. A computer system comprising:

a memory area for storing customer activity and compatibility information; and a processor programmed to:

receive a request for information associated with a first item from a customer;

obtain the requested information responsive to the received request;

examine online activity of the customer;

determine at least one category associated with the first item based at least in part on the examined online activity of the customer;

access the customer activity stored in the memory area;

identify one or more second items associated with the accessed customer activity of the customer and associated with the determined category; wherein the identified one or more second items have different utility than the first item;

determine the compatibility of the identified one or more second items and the first item; and indicate the determined compatibility and the obtained information to the customer.

9. The computer system of claim 8, wherein the memory area stores one or more of the following as the customer activity: a purchase history of the customer, a browsing history of the customer, and an item review written by the customer.

10. The computer system of claim 8, wherein indicating the determined compatibility and the obtained information comprises indicating at least one compatible second item.

11. The computer system of claim 8, wherein identifying the one or more second items comprises identifying one or more second items based on a preferred attribute determined from the accessed customer activity.

12. The computer system of claim 8, wherein identifying the one or more second items comprises identifying the one or more second items based on keywords extracted from a uniform resource locator associated with the received request.

13. The computer system of claim 8, wherein identifying the one or more second items comprises identifying the one or more second items based on an attribute of the first item.

14. The computer system of claim 8, wherein indicating the determined compatibility comprises indicating that the first item and at least one of the identified second items are not compatible.

15. The computer system of claim 8, wherein indicating the determined compatibility comprises indicating that the first item and at least one of the identified second items are compatible.

16. The computer system of claim 8, further comprising means for determining the compatibility of the first item with the identified second item.

17. The computer system of claim 8, further comprising means for identifying the second items and determining compatibility of the identified second items with the first item.

18. One or more computer readable storage media having computer-executable components, said components comprising:

an interface component for receiving a request for information associated with a first item from a customer;

an information component for obtaining the information associated with the first item;

an item component for determining categories for selection by the customer based on the first item based at least in part on online activity of the customer;

the interface component receiving, from the customer, a selection from the determined categories;

the item component determining one or more other items based on the selected categories, wherein the one or more other items have different utility than the first item;

the interface component identifying the other items to the user and receiving, from the customer, a selection of at least one of the other items; and a compatibility component for determining the compatibility of the first item and the selected other items, the interface component providing the determined compatibility and the requested information to the customer.

19. The computer readable storage media of claim 18, wherein the first item is an automotive replacement part.

20. The computer readable storage media of claim 19, wherein the categories define types of automotive replacement parts.

21. The computer readable storage media of claim 18, wherein the first item is a memory card.

22. The computer readable storage media of claim 21, wherein the categories define types of consumer electronic devices.

23. The computer readable storage media of claim 18, wherein the interface component is further configured to provide at least one third item associated with a category other than the selected category, the third item being compatible with the first item.

24. A method for improving a shopping experience of a customer, the method comprising:

receiving a request for information associated with a first item from the customer, wherein the first item is associated with at least one category that is determined based at least in part on online activity of the customer;

obtaining the requested information responsive to the received request;

identifying, via a processor, one or more second items associated with the at least one category and associated with the first item, wherein the identified one or more second items have different utility than the first item;

determining, via the processor, the compatibility of the identified one or more second items and at least one item previously associated with the customer;

identifying, via the processor, one or more second items that are compatible with the at least one item previously associated with the customer; and providing the identified one or more second items and the obtained information to the customer.

25. The method of claim 24, wherein providing the identified second items includes providing at least one additional compatible item.

26. The method of claim 24, wherein the at least one additional compatible item is determined based on one or more of the following: purchase history, customer's profile, and any grouping of products associated with the second item.

27. The method of claim 24, wherein the first item is a first type of gemstone and the at least one category is jewelry.

28. The method of claim 27, wherein the at least one item previously associated with customer are specific jewelry pieces that accept gemstones of a particular shape and size.

29. The method of claim 28, wherein the one or more identified second items are gemstones of different types than the first type of gemstone.

30. The method of claim 29, wherein the one or more compatible second items includes gemstones that are of the particular shape and size that will fit in the specific jewelry pieces.

* * * * *